United States Patent
Hwang et al.

(10) Patent No.: US 6,728,441 B2
(45) Date of Patent: Apr. 27, 2004

(54) APPARATUS TO COMBINE A FILTER TO A COLLIMATOR

(75) Inventors: Myeon-soon Hwang, Suwon (KR); Byung-gon Kim, Seoul (KR); Man-hwa Kim, Suwon (KR); Won-kyu Lim, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/175,816

(22) Filed: Jun. 21, 2002

(65) Prior Publication Data

US 2003/0156820 A1 Aug. 21, 2003

(30) Foreign Application Priority Data

Feb. 15, 2002 (KR) ............................................ 2002-8170

(51) Int. Cl.[7] .................................................. G02B 6/32
(52) U.S. Cl. ........................... 385/34; 385/136; 385/147
(58) Field of Search ............................. 385/32, 33, 34, 385/74, 93, 136, 137, 147

(56) References Cited

U.S. PATENT DOCUMENTS

| | | | | |
|---|---|---|---|---|
| 4,095,077 A | * | 6/1978 | Schneider et al. | 219/61 |
| 4,735,481 A | * | 4/1988 | Lukas et al. | 385/139 |
| 4,880,496 A | * | 11/1989 | Nebenzahl et al. | 216/93 |
| 5,265,179 A | * | 11/1993 | Ishiguro et al. | 385/33 |
| 6,034,718 A | * | 3/2000 | Hattori | 348/61 |
| 6,168,319 B1 | * | 1/2001 | Francis | 385/79 |
| 6,246,813 B1 | | 6/2001 | Zheng | |
| 6,343,166 B1 | * | 1/2002 | Hellman et al. | 385/31 |
| 6,396,980 B1 | * | 5/2002 | Liu et al. | 385/34 |

* cited by examiner

Primary Examiner—Tarifur R. Chowdhury
Assistant Examiner—Michael H Caley (57) ABSTRACT

An apparatus to combine a filter to a collimator includes a filter supporting part to support the filter which has one side coated with an adhesive, and a chucking holder provided in a lower part of the filter supporting part to chuck the collimator. The apparatus also includes an elevation part to elevate the chucking holder toward the filter supporting part, and at least one heating part provided in one side of the filter supporting part to heat a region of contact between the collimator and the filter. Thus, a filter combining apparatus for a collimator allows the filter to be easily combined to an end of the collimator.

27 Claims, 11 Drawing Sheets

APPARATUS TO COMBINE A FILTER TO A COLLIMATOR

CROSS-REFERENCE TO RELATED APPLICATIONS

This application claims the benefit of Korean Application No. 2002-8170, filed Feb. 15, 2002, in the Korean Industrial Property Office, the disclosure of which is incorporated hereby by reference.

BACKGROUND OF THE INVENTION

1. Field of the Invention

The present invention relates in general to an apparatus to manufacture a collimator, and more particularly, to an apparatus to combine a filter to a collimator.

2. Description of the Related Art

A collimator is a device used for optical communication, which transforms a light inserted through a light source into a parallel ray. The collimator is usually employed as a component in a variety of equipment including optical communication equipment, semiconductor equipment, etc.

A filter may be combined to an end of the collimator. The filter is provided to filter light inserted into a fiber formed in the collimator.

However, conventionally, the filter has manually been combined to the collimator. For example, a worker typically picks up the collimator and the filter with a tool such as a tweezer and coats either of the collimator or the filter with an adhesive such as an epoxy resin. Thereafter, the filter is combined to the end of the collimator and they are left for a certain period of time.

Consequently, the conventional collimator is thereby combined with a filter through a manual operation. Thus, production efficiency is remarkably reduced and product reliability decreases accordingly. In addition, a long period of time is consumed to produce the collimator, thereby reducing productivity.

SUMMARY OF THE INVENTION

Accordinigly, it is an object of the present invention to provide an apparatus to combine a filter to a collimator to allow the filter to be easily combined with an end of the collimator.

Additional objects and advantages of the invention will be set forth in part in the description which follows and, in part, will be obvious from the description, or may be learned by practice of the invention.

The foregoing and other objects of the present invention are achieved by providing an apparatus to combine a filter to an end of a collimator, thereby, filtering light inserted into the collimator. The apparatus includes a filter supporting part to support the filter, and a chucking holder provided in a part of the filter supporting part to chuck the collimator. The apparatus includes an elevation part to elevate the chucking holder toward the filter supporting part, and at least one heating part provided at one side of the filter supporting part to heat a region of contact between the collimator and the filter.

According to an aspect of the invention, the chucking holder includes a fixed block formed with a seating groove in which the collimator is seated, and a movable block having one end rotatably combined with one side of the fixed block, and the other end detachably combined with the other side of the fixed block to supportedly seat the collimator in the seating groove.

According to an aspect of the invention, the apparatus further includes a locking member to prevent the movable block from being detached from the fixed block when the movable block is combined to the fixed block.

According to another aspect of the invention, the filter supporting part includes a picking holder to pick up the filter, and a rotation part to support the picking holder and rotate the filter at a predetermined angle relative to an axial line of the collimator.

According to another aspect of the invention, the heating part includes a ultraviolet heating part disposed radially outside the filter supporting part and the filter is placed in the center thereof.

According to another aspect of the invention, the apparatus further includes an illuminating member provided in the one side of the filter supporting part to illuminate toward the region of contact between the collimator and the filter.

According to yet another aspect of the invention, the apparatus includes at least one camera provided at the one side of the filter supporting part to photograph the region of contact between the collimator and the filter, and an image displaying part connected to the camera to display an image photographed by the camera.

According to an aspect of the invention, the apparatus further includes a horizontal moving part to move the elevation part horizontally.

According to an aspect of the invention, the apparatus further includes a light supplying part to supply the inserted light to the collimator, and a light receiving part to receive the inserted light filtered by the filter.

According to an aspect of the invention, the apparatus further includes a controlling part to automatically control the elevation part, the horizontal moving part, the rotation part, the heating part, the illuminating member, the image displaying part, the light supplying part and the light receiving part.

BRIEF DESCRIPTION OF THE DRAWINGS

The above and other objects and advantages of the invention will become apparent and more appreciated from the following description of the preferred embodiments, taken in conjunction with the accompanying drawings of which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Figure 1:
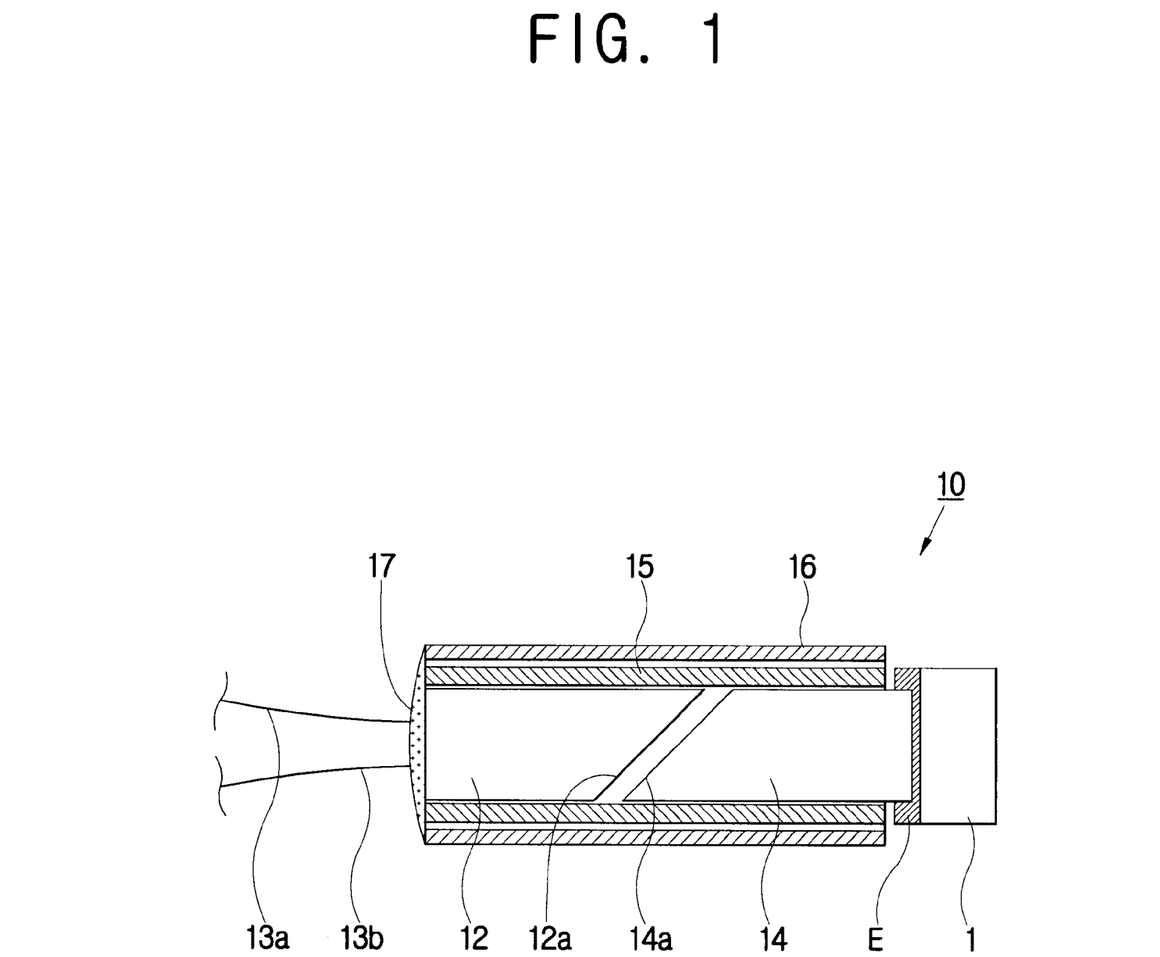
FIG. 1 is a sectional view of a collimator.

As shown in FIG. 1, a collimator 10 includes pigtail 12 and a GRIN (gradient index) lens 14 arranged on a mutual coaxial line, a glass tube 15 to receive and support the pigtail 12 and the GRIN lens 14, and a tubular metal sleeve 16 to protect an outside of the glass tube 15.

The pigtail 12 formed of glass is provided with a pair of fibers 13a and 13b forming an incidence channel of a predetermined light in one end of the pigtail 12, through which the light is inserted. The other end of the pigtail 12 is formed with a predetermined sloping side 12a.

One end of the GRIN lens 14 displaced coaxially with the pigtail 12 is formed of a sloping side 14a like the sloping side 12a of the pigtail 12. The sloping side 12a of the pigtail 12 and the sloping side 14a of the GRIN lens 14 are slopingly displaced opposite to each other.

To manufacture a collimator 10 with the configuration as described above, the GRIN lens 14 is fixedly inserted into the glass tube 15. The one end of the GRIN lens 14, on which the sloping side 14a is formed, is inserted into the glass tube 15, and the other end thereof is displaced to be exposed to the outside of the glass tube 15 at a predetermined distance.

If the GRIN lens 14 is supportedly received in one side of the glass tube 15, the pigtail 12 is inserted from the other side thereof. The one end of the pigtail 12, on which the sloping side 12a is formed, is received within the glass tube 15, and then the sloping side 12a of the pigtail 12 is slopingly displaced to be opposite to the sloping side 14a of the GRIN lens 14 already supportedly inserted within the glass tube 15.

The sloping side 12a of the pigtail 12 is slopingly displaced relative to the sloping side 14a of the GRIN lens 14 through an aligning process to comply with predetermined conditions for optical properties. Thereafter, if there is compliance with the predetermined conditions, the pigtail 12 is fixed within the glass tube 15.

If the GRIN lens 14 and the pigtail 12 are supportedly received within the glass tube 15, the glass tube 15 is inserted into the metal sleeve 16. Then, the glass tube 15 and the metal sleeve 16 are coated with epoxy resins 17, and are thereby fixedly combined with each other. In accordance with the above, manufacturing of the collimator 10 is completed.

The collimator 10 manufactured through the above-described process is employed in optical communication equipment, semiconductor equipment etc., and functions to transform light inserted through a light source into parallel rays. Accordingly, a filter is employed to filter a part of the light inserted from the light source. The filter 1 is combined with an end of the collimator 10 to form a filter combining apparatus.

Figure 2:
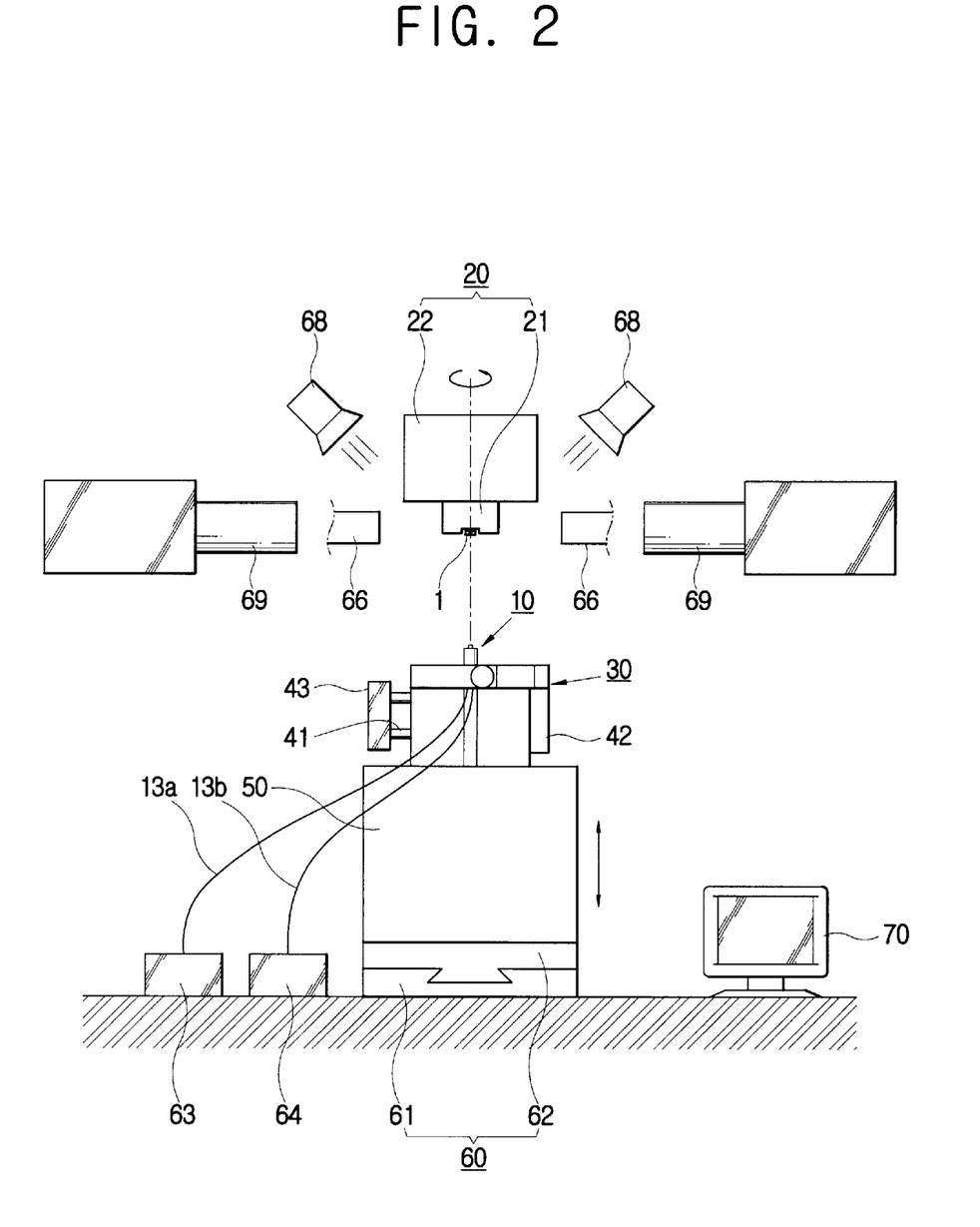
FIG. 2 is a schematic front view showing an apparatus to combine a filter to the collimator, according to an embodiment of the present invention.

As shown in FIG. 2, the filter combining apparatus includes a filter supporting part 20 to support the filter 1 having one side coated with an adhesive, a chucking holder 30 provided in a lower part of the filter supporting part 20 to chuck the collimator 10, and an elevation part 50 to elevate the chucking holder 30 toward the filter supporting part 20. The filter combining apparatus also includes a plurality of heating parts 66 provided in one side of the filter supporting part 20 to heat a region of contact between the collimator 10 and the filter 1.

The filter supporting part 20 includes a picking holder 21 to pick up the filter 1, and a rotation part 22 to support the picking holder 21 and rotate the filter 1 at a predetermined angle relative to an axial line of the collimator 10. The rotation part 22 includes a worm wheel disposed on a central axial line of the picking holder 21, a rotational shaft provided with a worm having a gear engaged with the worm wheel, and a motor to rotate the rotational shaft.

If the motor is operated to rotate the rotational shaft when combining the picking holder 21 with the worm wheel, the worm wheel engaged with the worm of the rotational shaft, is thereby rotated. Therefore, the picking holder 21 picking up the filter 1 is rotated at the predetermined angle.

Figure 4:
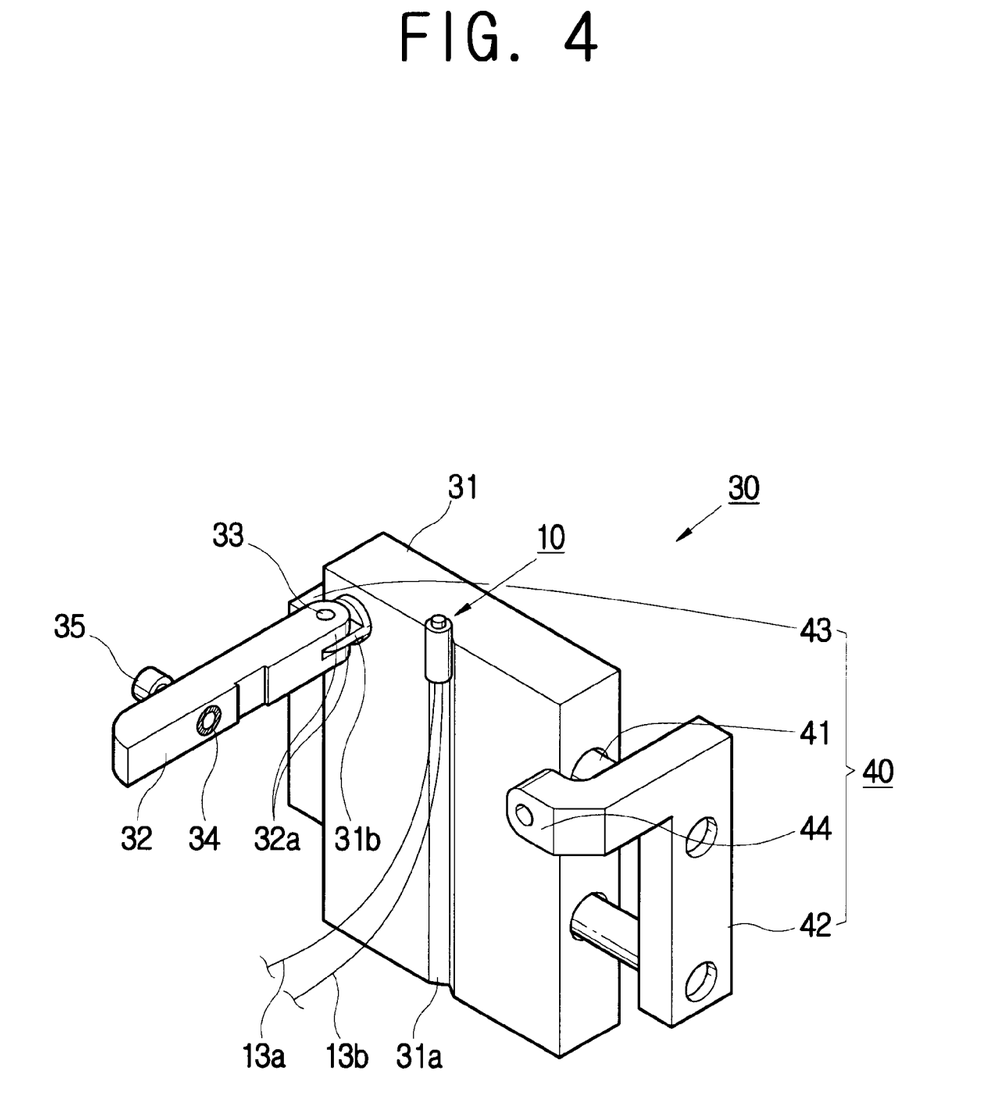
FIGS. 4 through 6 are perspective views showing operations of a chucking holder shown in FIG. 2.
Figure 5:
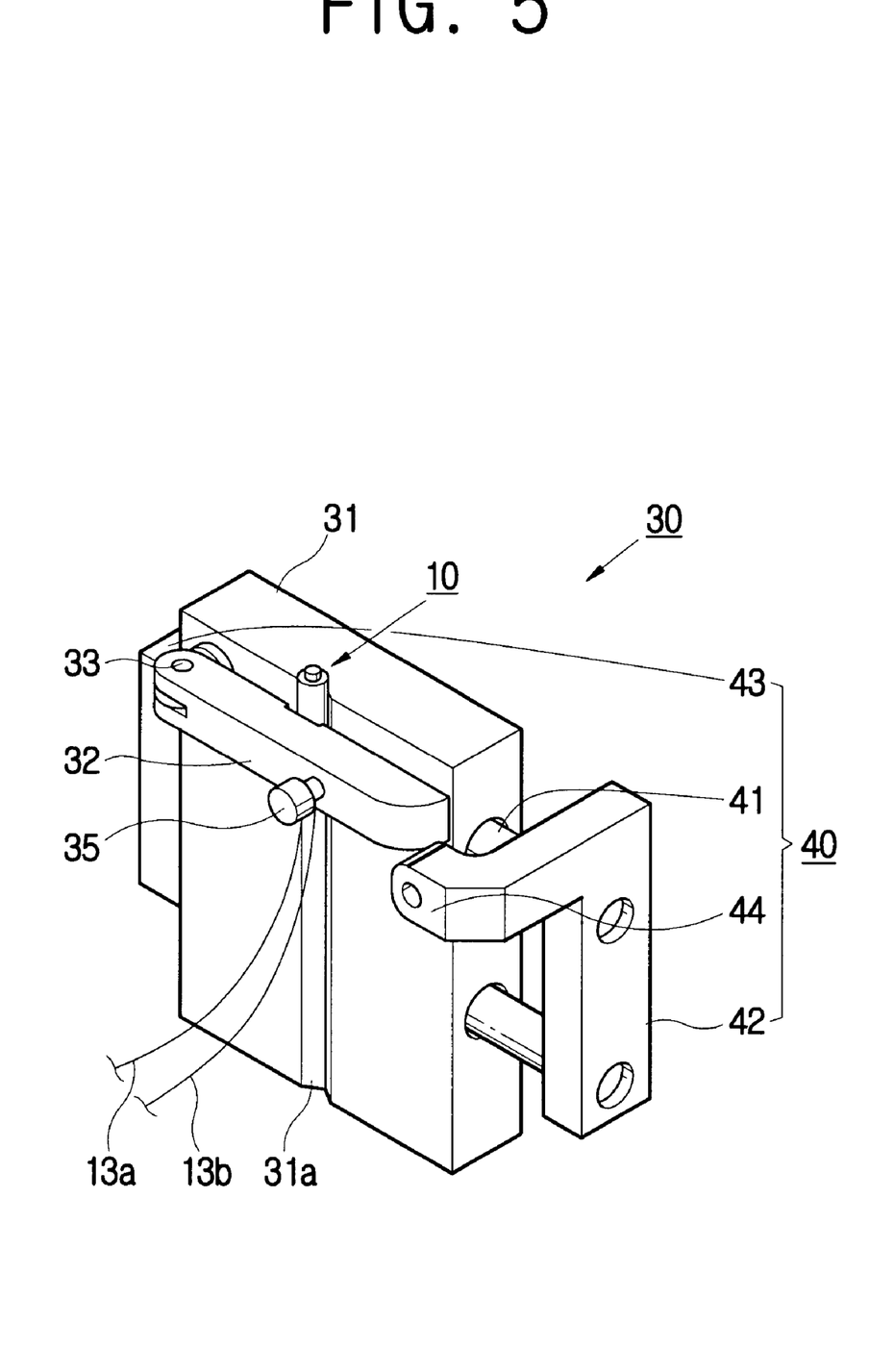

As shown in FIGS. 4 and 5, the chucking holder 30 includes a fixed block 31 formed with a seating groove 31a on which the collimator 10 is seated, and a movable block 32 pressing a side part of the collimator 10 seated in the seating groove 31a toward the fixed block 31. Therefore, the movable block 32 allows the collimator 10 to be seated in the seating groove 31a along with the fixed block 31.

One side of the fixed block 31 is formed with a projection 31b formed with a hinge hole (not shown). One end of the movable block 32 is formed with a pair of hinge brackets 32a in which the projection 31b is inserted. The hinge brackets 32a each include a hinge hole (not shown) corresponding to the hinge hole provided in the projection 31b. A hinge pin 33 is inserted into the hinge holes of the hinge brackets 32a and the hinge hole of the projection 31b, which are in correspondence with each other. Accordingly, the one end of the movable block 32 is rotatable relative to the one side of the fixed block 31.

The other end of the movable block 32 is provided with a magnet 34 magnetically contacted with the other side of the fixed block 31, thereby allowing the movable block 32 and fixed block 31 to be combined with and detached from each other. The other end of the movable block 32 is also provided with a knob part 35 to hold the movable block 32.

The knob part 35 employs an adjustable bolt positioned to pass through a planar surface of the movable block 32. The adjustable bolt functions to be a handle and also serves to adjust an interval between the fixed block 31 and the movable block 32. That is, for example, if the movable block 32 is combined with the fixed block 31 when an end of the adjustable bolt is projected to a predetermined distance from an inner face of the movable block 32 by rotating the bolt in a screwing direction, the interval between the fixed block 31 and the movable block 32 becomes broader. The magnet 34 provided at the other end of the movable block 32 causes no problem in combining the movable block 32 and the fixed block 31. Preferably, a buffering rubber is provided in the inner face of the movable block 32.

A locking member 40 is provided in the other side of the fixed block 31. The locking member 40 includes a connecting shaft 41 transversely passing through a plane of the fixed block 31, and a first movable piece 42 and second movable piece 43 combined with both ends of the connecting shaft 41. The locking member also includes a detachment preventing part 44 bent from an end of the first movable piece 42 to prevent the movable block 32 combined with the fixed block 32 from being detached from the fixed block 31.

The elevation part 50 elevatably moves the chucking holder 30 toward the filter supporting part 20. The elevation part 50 includes a general cylinder. Otherwise, the elevation part 50 may include a ball screw rotated in a one-side direction at an original position of the elevation part 50 by a motor, and an elevatable piece having one end combined with the ball screw being movable in a lengthwise direction of the ball screw in response to rotation of the ball screw, and another end combined with the chucking holder 30. Drawings and reference numerals for the above-described elements of the elevation part 50 have been omitted.

A horizontal moving part 60 is provided in a lower part of the elevation part 50. The horizontal moving part 60 includes a rail 61 provided on a predetermined supporting part, and a rail block 62 having a lower part slidingly engaged into the rail 61, a dovetail shaped guide, and an upper part combined with the elevation part 50. The horizontal moving part also includes a motor (not shown) slidingly moving the rail block 62 relative to the rail 61.

Figure 8:
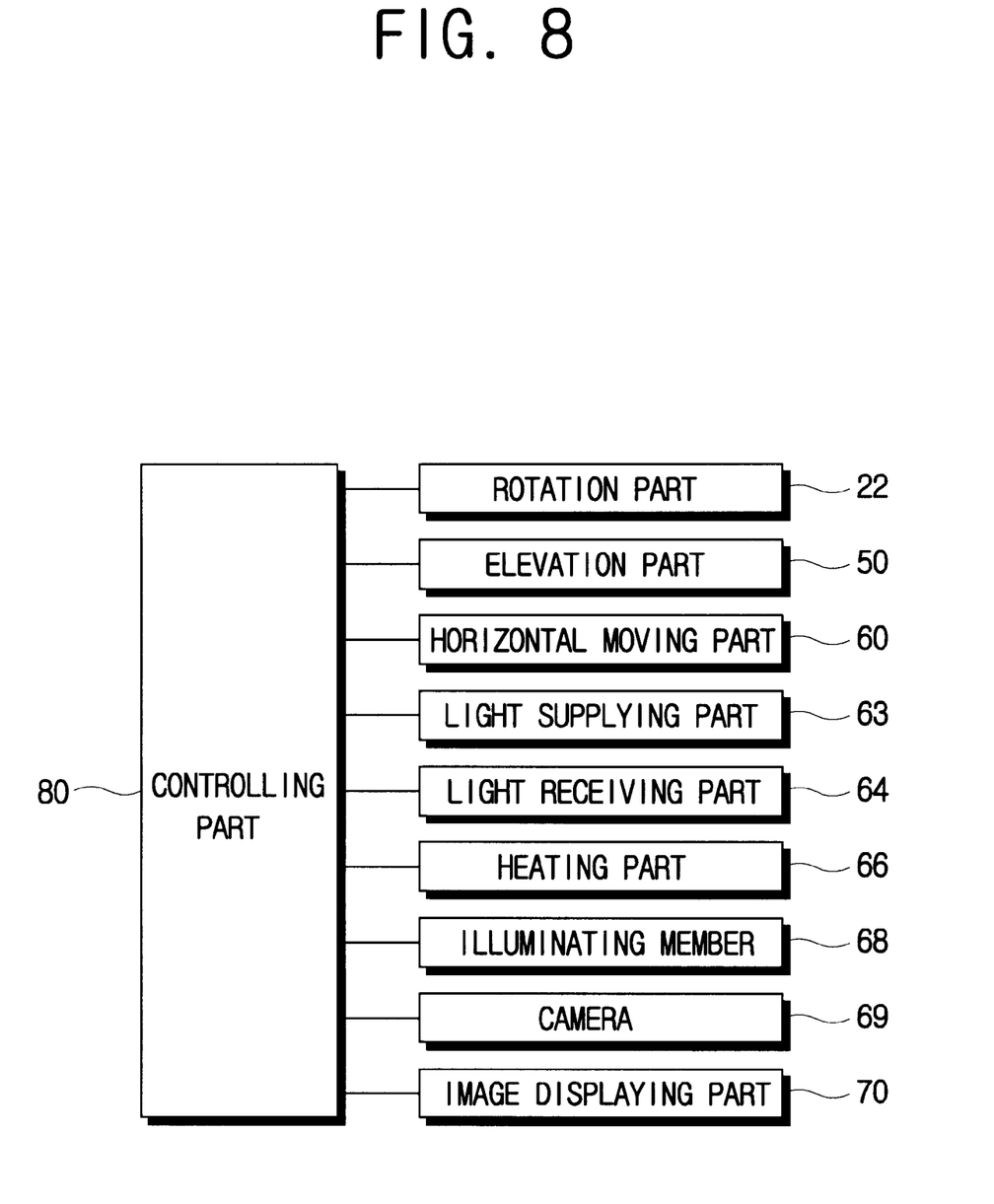
FIG. 8 is a control block diagram of the present invention.

The elevation part 50, the horizontal moving part 60 and the rotation part 22 are all connected to a controlling part 80; (see FIG. 8) and thus, the elevation part 50, the horizontal moving part 60, and the rotation part 22 move the chucking holder 30 of which the collimator 10 is installed, horizontally and vertically An end of the collimator 10 mounted on the chucking holder 30 is in contact with the filter 1.

A pair of fibers 13a and 13b provided in the collimator 10 are respectively connected to a light supplying part 63 and a light receiving part 64. If light from the light supplying part 63 is supplied to the first fiber 13a when the collimator 10 is moved by the elevation part 50 and the horizontal moving part 60, the light is reflected against the filter 1 and returned to the light receiving part 64 through the second fiber 13b.

Figure 3:
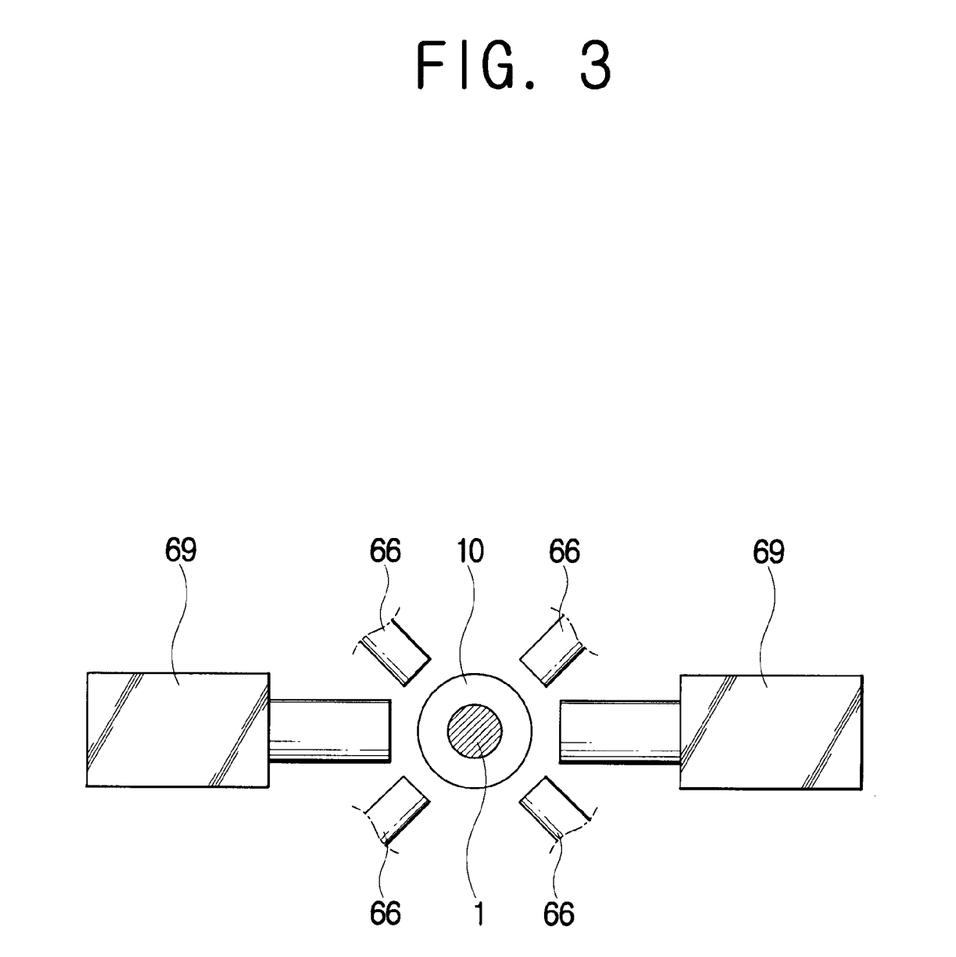
FIG. 3 is a view showing positioning of a heating part and a camera which are shown in FIG. 2.

As shown in FIG. 3, the heating part 66 is arranged radially and the filter 1 is placed in the center thereof. The heating part 66 heats a region on which the collimator 10 and the filter 1 are in contact with each other. The heating part 66 typically includes a heater. However, the present invention employs an ultraviolet heating part to apply ultraviolet radiation.

While the region of contact between the collimator 10 and the filter 1 is heated by the heating part 66, a heating state of the region of contact and an arranged state of the collimator 10 relative to the filter 1 need to be checked. In this regard, the present invention further provides a plurality of cameras 69 installed on one side of the filter supporting part 20 to photograph the region of contact between the collimator 10 and the filter 1, and an image displaying part 70 connected to the cameras 69 to display images photographed by the cameras 69.

The camera 69 photographs the collimator 10 in a horizontal direction relative to a side part of the filter supporting part 20 and photographs the collimator 10 in a vertical direction If an illuminating member 68 is further provided to illuminate the region of contact between the collimator 10 and the filter 1, the images photographed by the camera 69 are displayed on the image displaying part 70 more vividly and clearly.

An operating process of the filter combining apparatus according to the above-described configuration is described below.

First, the filter 1 is mounted on the picking holder 21 of the filter supporting part 20, and then the collimator 10 is chucked on the chucking holder 30.

As shown in FIG. 4, the movable block 32 is rotated and opened relative to the fixed block 31, thereby placing the hinge pin 33 as a pivot provided at one end of the movable block 32. The collimator 10 is displaced in the seating groove 31a provided in the fixed block 31, and the movable block 32 is rotated to allow the magnet 34 provided in the other end of the movable block 32 to be magnetically combined with the other side of the fixed block 31 (see FIG. 5). Here, the second movable piece 43 is in contact with the one side of the fixed block 31 and the first movable piece 42 is separated from the other side of the fixed block 31.

Figure 6:
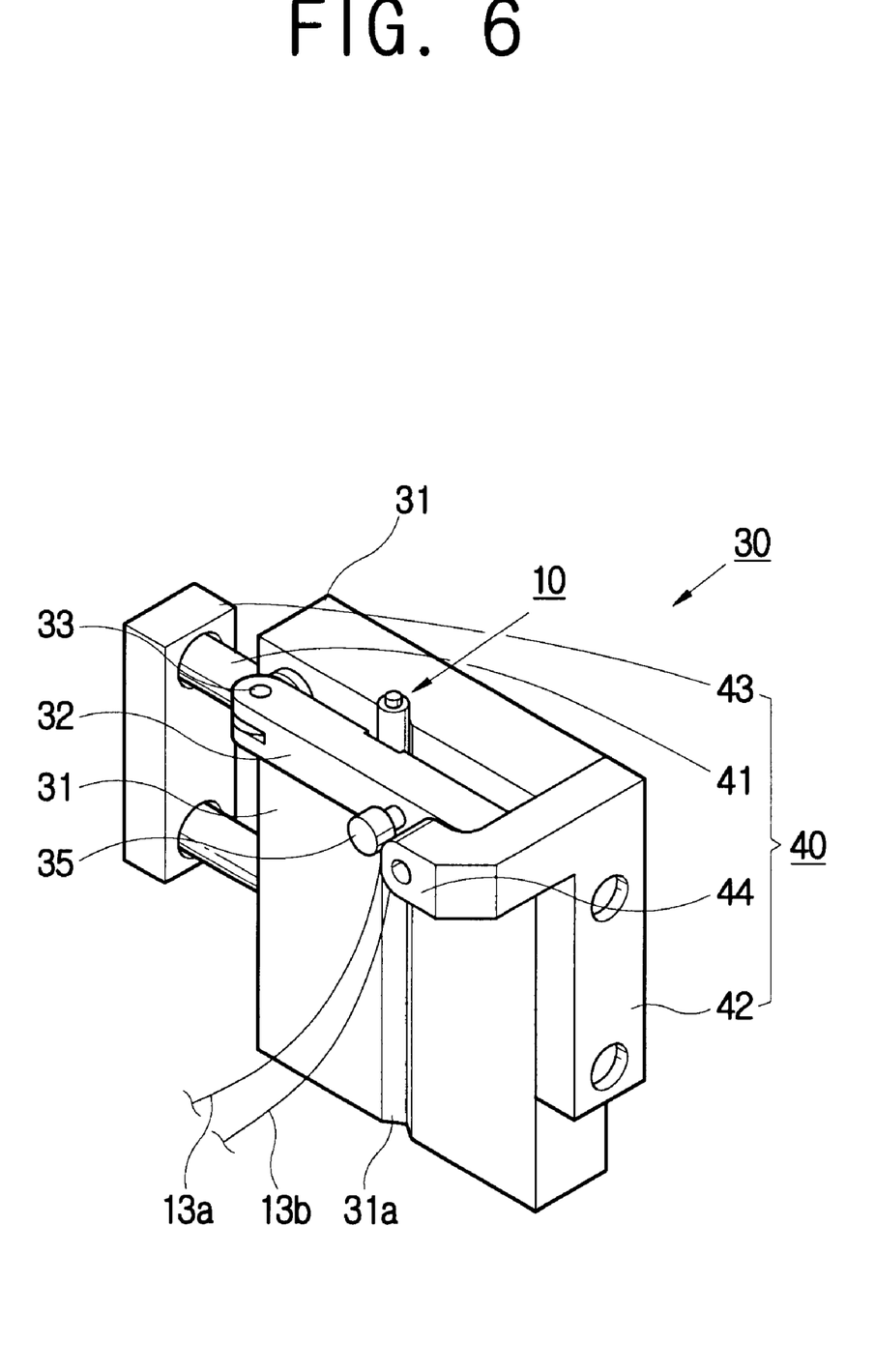

Next, the first movable piece 42 is pressed toward the second movable piece 43. Then, as the detachment preventing part 44 provided at the first movable piece 42 is positioned in the side part of the movable block 32, the first movable piece 42 is contacted with the other side of the fixed block 31, and the second movable piece 43 is separated from the one side of the fixed block 31. Accordingly, the operation of locking the movable block 32 is completed (see FIG. 6).

Typically, when mounting of the filter 1 and the collimator 10 is completed, either of exposed ends of the filter 1 and the collimator 10 are coated with an adhesive E such as epoxy resins. In the present embodiment, the end of the filter 1 is coated with the epoxy resins.

Figure 7A:
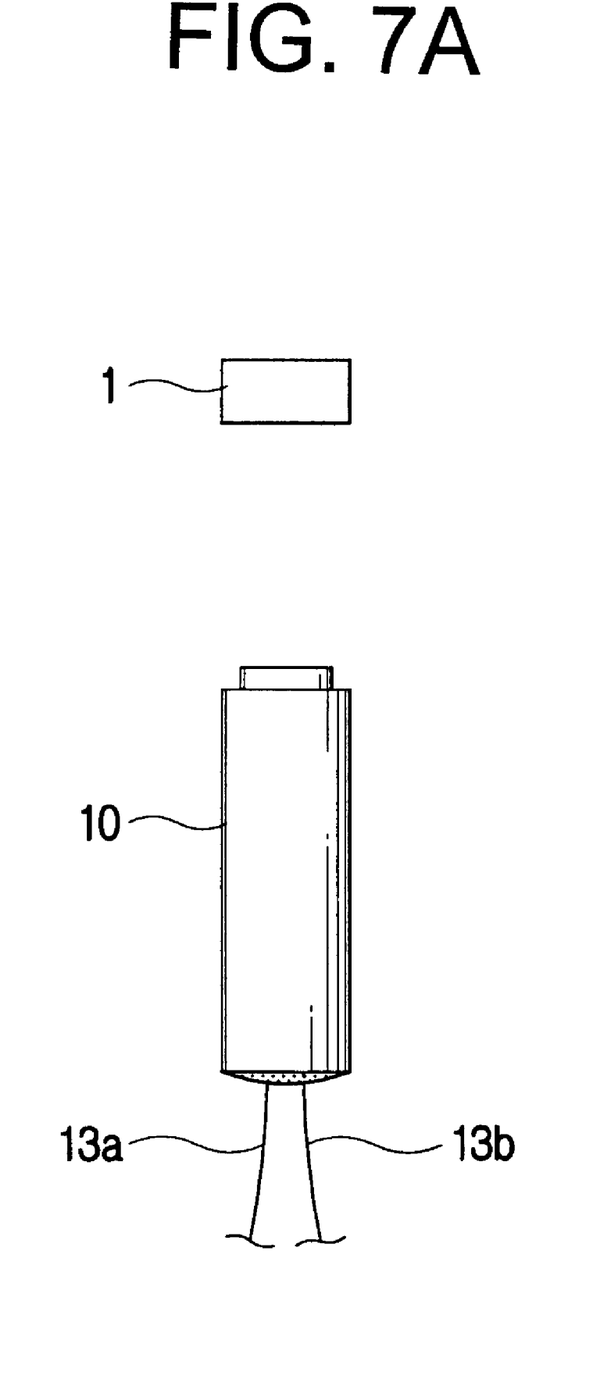
FIGS. 7A through 7D are views showing the process of combining the collimator with the filter, according to an embodiment of the present invention.
Figure 7B:
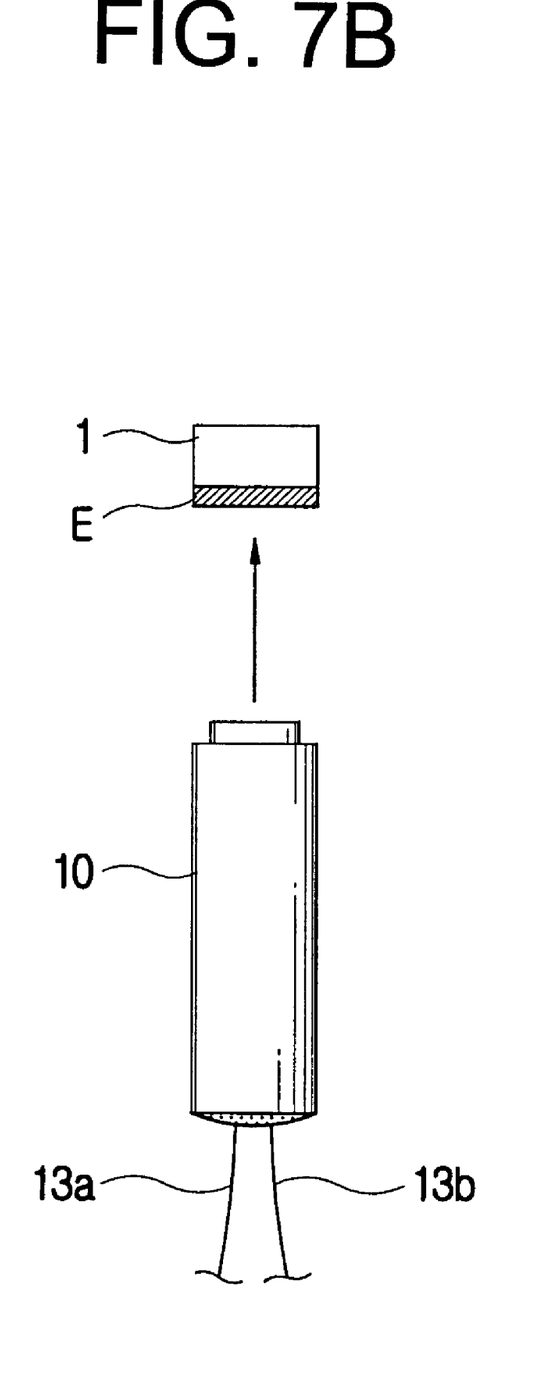
Figure 7C:
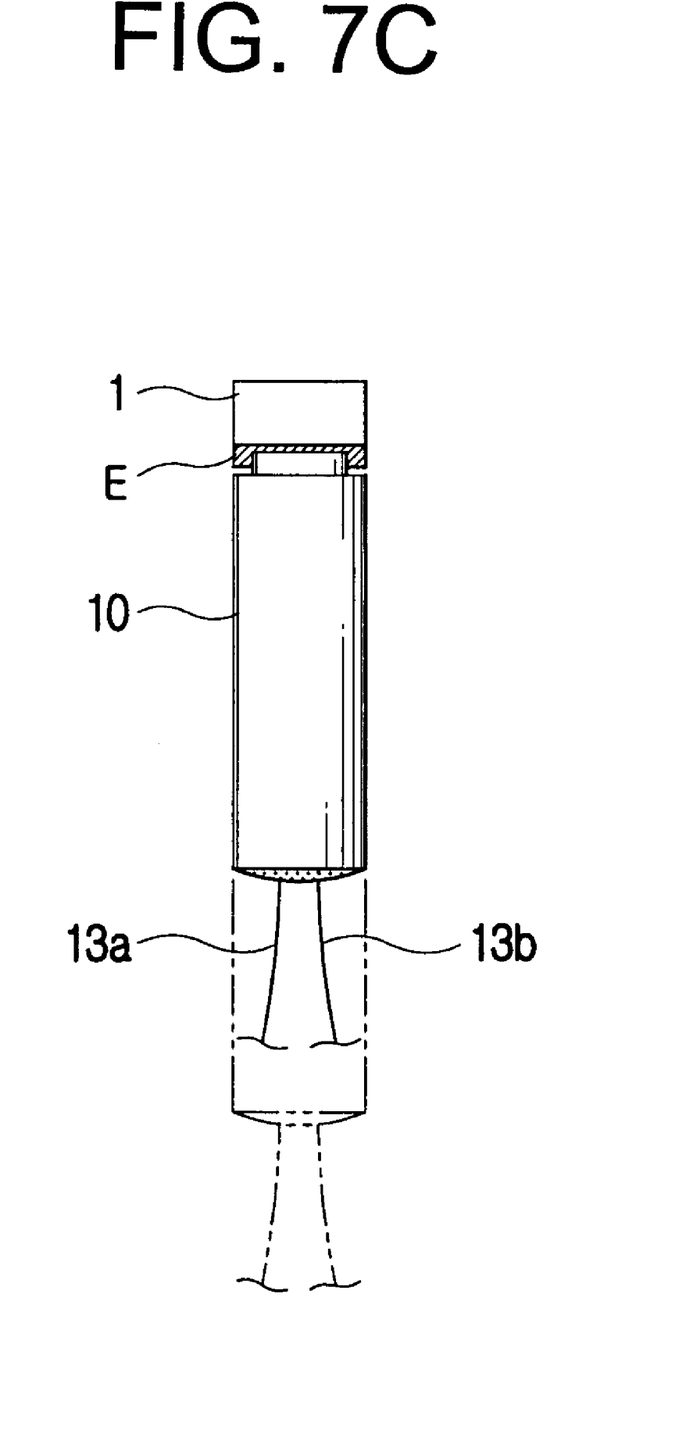
Figure 7D:
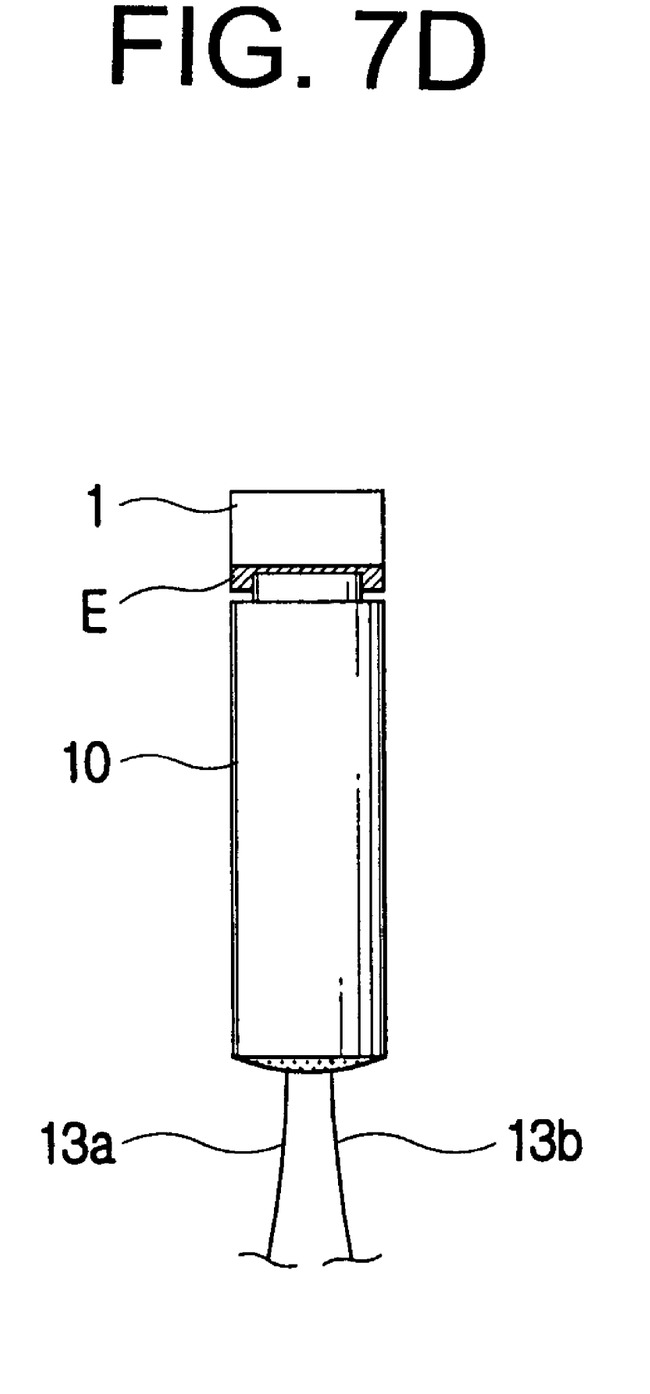

After a loading process is completed (see FIG. 7A), if the motor of the horizontal moving part 60 is operated according to a signal from the controlling part 80, the rail block 62 combined with the elevation part 50 is moved a predetermined distance relative to the rail 61. If a process for horizontal movement of the elevation part 50 is completed, the elevation part 50 is, as shown in FIG. 7B, operated to raise the chucking holder 30 to a predetermined distance of height, thereby allowing the end of the collimator 10 to be in contact with the filter 1 (see FIG. 7C).

Next, light from the light supplying part 63 is supplied to the first fiber 13a by a control signal. The light inserted into the first fiber 13a passes through the pigtail 12 and the GRIN lens 14 of the collimator 10 and is then reflected against the filter 1. Thereafter, light is received in the light receiving part 64 through the second fiber 13b. During this process, the controlling part 80 checks arrangement of the filter 1 relative to the collimator 10, and rotates the rotation part 22 adaptively to thereby place the filter 1 in a right position.

If arrangement of the collimator 10 and the filter 1 is completed, the heating part 66 is operated by a control signal to begin heating the contacted region of the collimator 10 and the filter 1. Here, the illuminating member 68 is turned on and the region of contact between the collimator 10 and the filter 1 being heated is photographed by a plurality of cameras 69. Thus, the photographed images are displayed in the image displaying part 70. Accordingly, a worker may monitor the processes of combining the filter 1 with the collimator 10.

If the combination of the collimator 10 and the filter 1 is completed after a predetermined period of time has passed, the picking holder 21 picking up the filter 1 is opened. Thereafter, the chucking holder 30 is returned to an original position by an operation of the elevation part 50 and the horizontal moving part 60.

In the above-described embodiment, operation of the heating part 66 and the cameras 69 has not been described. However, by providing the heating part 66 and the cameras 69 with predetermined driving parts, the heating part 66 and the cameras 69 may be moved to predetermined places for operation and returned to original positions according to control signals.

The above-described elevation part 50, horizontal moving part 60, rotation part 22, heating part 66, illuminating member 68, image displaying part 70, light supplying part 63 and light receiving part 64 may all be controlled automatically by the controlling part 80. In particular, the images displayed on the image displaying part 70 and treatment thereof, may be performed by using an interface such as a touch screen.

As described above, the present invention provides a filter combining apparatus for a collimator, allowing the filter to be easily combined to an end of the collimator.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus to combine a filter to an end of a collimator, thereby filtering light inserted into the collimator, comprising:
    a filter supporting part to support the filter;
    a chucking holder provided in a part of the filter supporting part to clamp the collimator to the chuck holder and to chuck the collimator;
    an elevation part to elevate the chucking holder toward the filter supporting part; and
    at least one heating part provided at one side of the filter supporting part to heat a region of contact between the collimator and the filter.

2. The apparatus according to claim 1, wherein the chucking holder comprises:
    a fixed block formed with a seating groove in which the collimator is seated; and
    a movable block having one end rotatably combined with one side of the fixed block and the other end detachably combined with the other side of the fixed block to supportedly seat the collimator in the seating groove.

3. The apparatus according to claim 2, wherein the fixed block and the movable block each are provided with a hinge part, thereby allowing the one end of the movable block to be rotatable to the one side of the fixed block.

4. The apparatus according to claim 3, wherein the other end of the movable block is provided with a magnet to magnetically contact the movable block with the other side of the fixed block, thereby allowing the movable block and the fixed block to be combined and detached from each other.

5. The apparatus according to claim 4, wherein the movable block is provided with a knob part passing through a planar surface of the movable block to adjust an interval between the fixed block and the movable block.

6. The apparatus according to claim 2, further comprising:
    a locking member to prevent the movable block from being detached from the fixed block when the movable block is combined to the fixed block.

7. The apparatus according to claim 6, wherein the locking member comprises:
    a connecting shaft to transversely pass through a plane of the fixed block;
    a first movable piece and a second movable piece to combine with opposite ends of the connecting shaft; and
    a detachment preventing part bent from an end of the first movable piece to prevent the movable block from being detached from the fixed block.

8. The apparatus according to claim 7, wherein the detachment preventing part is positioned in a side part of the movable block, the first movable piece is contacted with the other side of the fixed block, and the second movable piece is separated from the one side of the fixed block, thereby completely locking the movable block.

9. The apparatus according to claim 1, wherein the filter supporting part comprises:
    a picking holder to pick up the filter; and
    a rotation part to support the picking holder and rotate the filter at a predetermined angle relative to an axial line of the collimator.

10. The apparatus according to claim 9, wherein the rotation part comprises a worm wheel disposed on a central axial line of the picking holder, a rotational shaft provided with a worm having a gear engaged with the worm wheel, and a motor to rotate the rotational shaft, thereby allowing the picking holder picking up the filter to rotate at the predetermined angle.

11. The apparatus according to claim 1, wherein the heating part comprises:
    an ultraviolet heating part disposed radially outside the filter supporting part and the filter is placed in the center thereof.

12. The apparatus according to claim 9, further comprising:
    an illuminating member provided in the one side of the filter supporting part to illuminate toward the region of contact between the collimator and the filter.

13. The apparatus according to claim 12, further comprising:
    at least one camera provided in the one side of the filter supporting part to photograph the region of contact between the collimator and the filter; and
    an image displaying part connected to the camera to display an image photographed by the camera.

14. The apparatus according to claim 13, wherein the heating part and the camera are provided with driving parts to move the heating part and the camera to predetermined places for operation.

15. The apparatus according to claim 13, further comprising:
    a horizontal moving part provided in a lower part of the elevation part to move the elevation part horizontally.

16. The apparatus according to claim 15, wherein horizontal moving part comprises:
    a rail provided on a predetermined supporting part;
    a rail block having a lower part slidingly engaged into the rail, a dovetail shaped guide, and an upper part combined with the elevation part; and
    a motor to slidingly move the rail block to the rail, thereby moving the elevation part horizontally.

17. The apparatus according to claim 15, further comprising:
    a light supplying part to supply the inserted light to the collimator; and
    a light receiving part to receive the inserted light filtered by the filter.

18. The apparatus according to claim 17, wherein a first fiber and a second fiber are provided in the collimator and connected to the light supplying part and the light receiving part, respectively, so that the light supplied by the light supplying part is supplied through the first fiber, reflected against the filter, and received by the light receiving part through the second fiber.

19. The apparatus according to claim 17, further comprising:
    a controlling part to automatically control the elevation part, the horizontal moving part, the rotation part, the heating part, the illuminating member, the image displaying part, the light supplying part and the light receiving part.

20. The apparatus according to claim 1, wherein the elevation part comprises a cylinder.

21. The apparatus according to claim 1, wherein the elevation part comprises:
    a ball screw rotated in a direction of an original position of the elevation part by a motor; and an elevatable piece having one end combined with the screw ball and movable in a lengthwise direction of the ball screw in response to rotation of the ball screw, and another end combined with the chucking holder, thereby elevating the chucking holder.

22. The apparatus according to claim 1, an end of the filter and the end of the collimator are coated with an epoxy resin.

23. The apparatus according to claim 19, wherein the controlling part checks an alignment of the filter relative to the collimator, and rotates the rotation part adaptively to thereby properly align the filter.

24. An apparatus to combine a filter to an end of a collimator, thereby filtering light inserted into the collimator, comprising:

a filter supporting part to support the filter;

a chucking holder provided in a part of the filter supporting part to clamp the collimator to the chuck holder and to chuck the collimator, wherein at least one of the filter and the collimator has a side coated with an adhesive; and a moving part to move the filter towards the collimator to contact the filter and the collimator via the side of the filter and/or collimator coated with the adhesive, thereby allowing the filter to be combined with the collimator.

25. An apparatus to combine a filter to an end of a collimator, thereby filtering light inserted into the collimator, comprising:

a filter supporting part to support the filter;

a chucking holder provided in a part of the filter supporting part to clamp the collimator to the chuck holder and to chuck the collimator, wherein at least one of the filter and the collimator has a side coated with an adhesive;

a controlling part to check an alignment of the filter relative to the collimator; and a moving part to move the filter towards the collimator to contact the filter and the collimator via the side of the filter and collimator coated with the adhesive, thereby allowing the filter to be easily combined with the collimator.

26. A method of combining a filter to an end of a collimator, thereby filtering light inserted into the collimator, the method comprising:

mounting the filter at a predetermined position;

chucking the collimator in a direction of the filter relative to the predetermined position;

moving the collimator towards the predetermined position of the filter; and heating a region of contact between the collimator and the filter to combine the filter with the collimator.

27. A method of combining a filter to an end of a collimator, thereby filtering light inserted into the collimator, the method comprising:

mounting the filter at a predetermined position;

chucking the collimator in a direction of the filter relative to the predetermined position, wherein at least one of the filter and the collimator has a side coated with an adhesive;

moving the collimator towards the predetermined position of the filter to contact the filter and the collimator via the side of the filter and/or collimator coated with the adhesive, thereby allowing the filter to be combined with the collimator.

* * * * *